United States Patent [19]

Ueda et al.

[11] Patent Number: 4,677,335
[45] Date of Patent: Jun. 30, 1987

[54] AXIAL GAP TYPE CORELESS ELECTRIC MOTOR WITH NOISE REDUCTION

[75] Inventors: Takemi Ueda; Norio Umezawa, both of Takefu, Japan

[73] Assignee: Matsushita Electric Industrial Co., Ltd., Kadoma, Japan

[21] Appl. No.: 778,517

[22] Filed: Sep. 20, 1985

[30] Foreign Application Priority Data

Sep. 26, 1984 [JP] Japan ................................ 59-200864

[51] Int. Cl.⁴ .............................................. H02K 5/00
[52] U.S. Cl. ..................................... 310/268; 310/51; 310/89
[58] Field of Search .................... 310/67 R, 68 D, 46, 310/89, 154, 256, 268, 51

[56] References Cited

U.S. PATENT DOCUMENTS

| | | | |
|---|---|---|---|
| 2,438,629 | 3/1948 | Anderson | 310/268 |
| 3,912,956 | 10/1975 | Müller | 310/268 |
| 4,357,550 | 11/1982 | Müller | 310/268 |

FOREIGN PATENT DOCUMENTS

| | | | |
|---|---|---|---|
| 2802753 | 7/1979 | Fed. Rep. of Germany | 310/268 |
| 2853319 | 7/1979 | Fed. Rep. of Germany | 310/154 |
| 1581350 | 12/1980 | United Kingdom | 310/268 |

*Primary Examiner*—Patrick R. Salce
*Assistant Examiner*—D. L. Rebsch
*Attorney, Agent, or Firm*—Cushman, Darby & Cushman

[57] ABSTRACT

In an axial gap type coreless electric motor, a frame bracket (16), which is disposed facing a field magnet (12) with a rotary armature (14) inserted in between, has radial ribs (19) formed outside thereof and disposed radially from a central part to a peripheral part of the frame bracket. The ribs are tapered, with their heights and widths gradually narrowed from the center part to the peripheral parts of the frame bracket.

3 Claims, 8 Drawing Figures

4,677,335

AXIAL GAP TYPE CORELESS ELECTRIC MOTOR WITH NOISE REDUCTION

BACKGROUND OF THE INVENTION

1. Field of the Invention

The present invention relates to a coreless electric motor having an axial gap, being especially thin so as to be used such as a blower of a car radiator or a driving source of a copy machine and so on by being driven by a direct current power source.

2. Description of the Related Art

A core-less electric motor can be made flat by having an axial gap. Recently there is a demand for motors being thinner, lighter, lower in acoustic noise and lower in cost so as to be used as parts of cars or a copy machine.

First, a conventional coreless electric motor is explained with reference to the accompanying drawings.

FIG. 4 is a cross-sectional side view of a conventional coreless electric motor. As shown in FIG. 5, a doughnut shaped field magnet 1 is alternately magnetized N and S in a rotational direction, and it is fixed on the inside wall of an outer frame bracket 2 by using an adhesive, or the like. A coreless armature 3 has a flat disk shape and is disposed against the field magnet 1 with a little gap inbetween. An inner frame bracket 4 which also serves as a magnetic yoke is disposed against the armature 3 with a small gap in between. A brush 5 which is for feeding an electric current for the armature 3 is fixed on the inner frame bracket 4. A shaft 6 which is connected with the armature 3 is held by a bearing cover 8 through bearings 7A and 7B.

FIG. 5 is a front view of the field magnet 1.

As shown in FIG. 5, the field magnet 1 has radial non-magnetized parts 9a, 9b, 9c, 9d, 9e, 9f and 9g between the magnetic poles. Magnetic flux flows in a path which is from an N-pole of the field magnet 1, through the gap 10A, the armature 3, gap of the inner frame bracket 4, gap 10B, the armature 3, gap 10C, an S-pole of the field magnet 1, the outer frame bracket 2 and to the N-pole of the field magnet 1 in FIG. 4. At this time by being fed with an electric current through the brush 5, the armature 3 begins to rotate in accordance with Fleming's rule. As above-mentioned, the conventional coreless electric motor has an axial gap for reducing its thickness. It is, however, insufficient to reduce the thickness because the field magnet 1 and the brush 5 are disposed together in the axial direction.

FIG. 6 is a cross-sectional side view of another conventional coreless electric motor.

As shown in FIG. 6, the core-less electric motor has a brush 5 and a field magnet 1 disposed in a concentric relation in regard to the axis of an armature 3. The motor is thinner, and an inner frame bracket 10, inner frame bracket 4 and bearing cover 8 are integrated in one body as shown in FIG. 4 to reduce its weight. In this case, the flow of the magnetic flux uses the outer frame bracket 11 and the inner frame bracket 10 as the magnetic yoke similarly to the coreless electric motor in FIG. 4. In such case, the reaction of the armature 3 caused by feeding an electric current thereto makes the magnetic flux of the field magnet 1 nonuniform. Thereby, when looking at a point on the surface the outer frame bracket 11 which is disposed against the field magnet 1, periodic nonuniformity of the intensity of the magnetic field with respect to time results. Thus, strain which is determined by rigidity of the outer frame bracket 11 induces periodic nonuniformity as time lapses, so that acoustic noise due to magnetic oscillation is produced from the outer frame bracket 11.

In the conventional coreless electric motor, to reduce the acoustic noise and the stress, the thickness of the frame has been changed, but it naturally has resulted in a problem of heavy weight for the apparatus.

SUMMARY OF THE INVENTION

Accordingly, the purpose of the present invention is to provide an improved coreless electric motor, especially an axial gap type coreless electric motor, which is super-thin in thickness, super-light in weight, low in acoustic noise and low in cost.

An axial gap type core-less electric motor in accordance with the present invention comprises:

a flat disk type core-less armature rotatably disposed with a small gap against a field magnet, and a frame bracket which also serves as a magnetic yoke and is disposed on the opposite side of the armature against the field magnet with a small gap inbetween, the frame bracket having radial ribs formed on the outer face of the frame bracket, and centering around a rotor shaft which is connected with the armature.

DESCRIPTION OF THE PREFERRED EMBODIMENTS

Preferred embodiments are described with reference to FIG. 1(a), FIG. 1(b), FIG. 2 and FIG. 3.

Figure 1A:
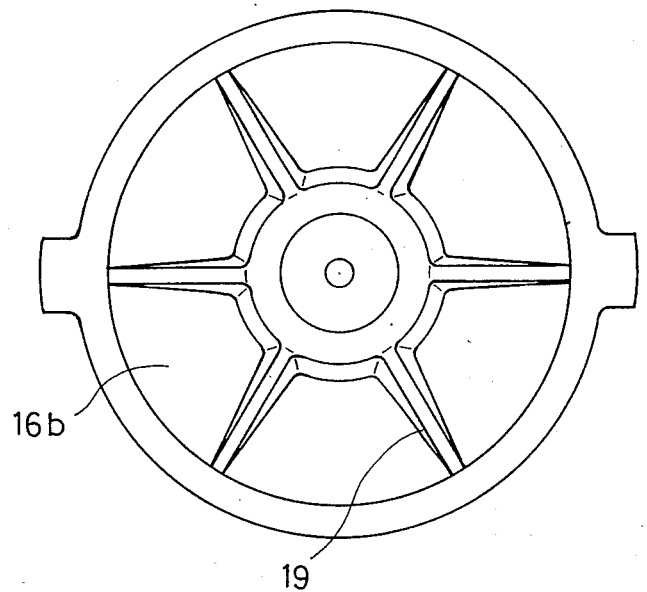
FIG. 1(a) is a schematic front view of a frame bracket of a preferred embodiment of an axial gap type coreless electric motor in accordance with the present invention.
Figure 1B:
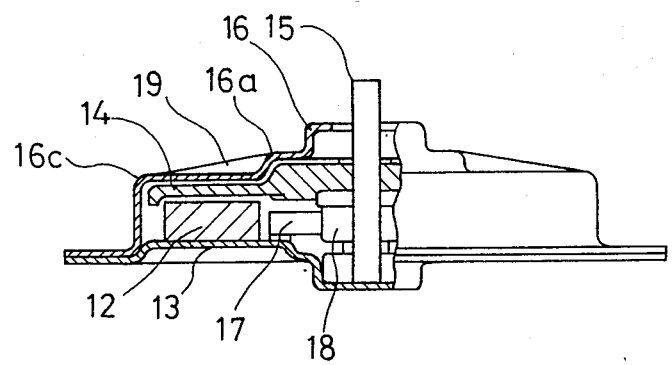
FIG. 1(b) is a cross-sectional side view of a preferred embodiment of an axial gap type coreless motor in accordance with the present invention.

As shown in FIG. 1(b), an axial gap type coreless motor comprises an inner frame bracket 13, a doughnut shaped field magnet 12 which is fixed on the inside wall of the inner frame bracket 13 by using an adhesive or the like, a flat disk type coreless armature 14 which is disposed against the field magnet 12 with a small gap in between, a rotor shaft 15 which is connected with the armature 14, an outer frame bracket 16 which also serves as a magnetic yoke which is disposed against the armature 14 with a small gap, and having radial ribs 19 around the rotor shaft 15 on the opposite side on which the field magnet 12 is fixed, a pair of brushes 17 which are fixed on the innerframe bracket 13, and a commutator 18 which is mounted on the armature 14. The brushes 17 are operatively engaged with the commutator 18. In this case the frame brackets 13 and 16 are made of a magnetic substance such as iron. The height of the ribs 19 is formed tapering gradually lower extending radially from an outside face of a housing 16a which holds a bearng to a peripheral part 16c of the flat yoke part 16b shown in FIG. 1(a). And also, the width of the ribs 19 is formed tapering gradually narrow from the outside face of the housing 16a to the peripheral part 16c.

In the following discussion, the operation of the axial gap type coreless electric motor is explained.

Figure 5:
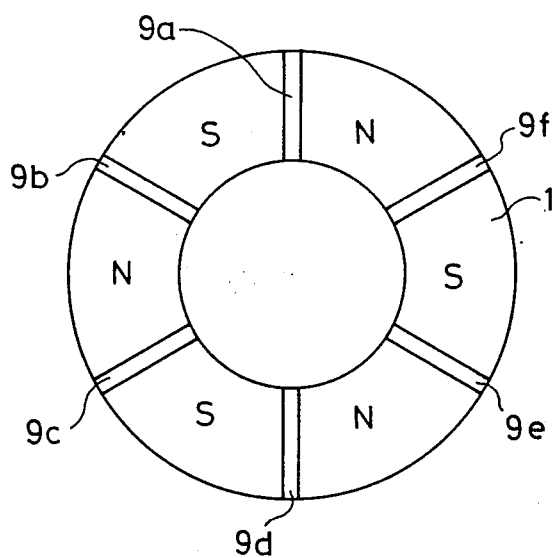
FIG. 5 is the front view of the field magnet of the coreless electric motor of FIG. 4.
Figure 6:
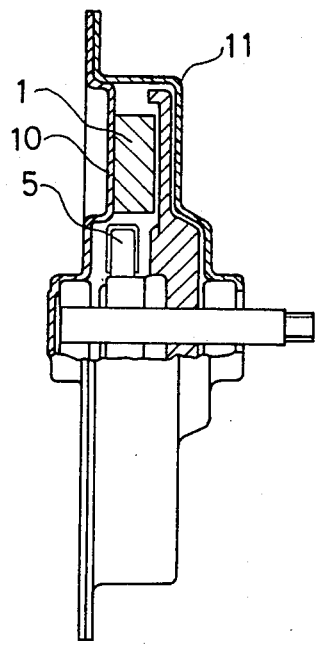
FIG. 6 is the cross sectional side view of another conventional coreless electric motor.

The field magnet 12 had radial non-magnetized parts, similar to the conventional coreless electric motor in FIG. 5.

The magnetic flux from the N-pole of the field magnet 12 flows through the armature 14, entering the outer frame bracket 16, passing through the outer frame bracket 16 to the part facing an S-pole of the field magnet 12, passing through the armature 14 again, entering another S-pole of the field magnet 12 and passing through the inner frame bracket 13 to the part facing an N-pole of the field magnet 12. At this time, when an electric current is fed through the brush 17 to the commutator 18, the rectified current flows to the armature 14 and the armature 14 begins to rotate.

Thereby, the armature reaction is generated by the current passing through the armature 14, and the magnetic power acts upon the outer frame bracket 16. The outer frame bracket 16 has radial ribs 19, so that it gives high rigidity and the strain due to the changing of the magnetic source becomes small. Accordingly, the acoustic noise which is radiated from the motor can be drastically reduced.

The result of improvement in accordance with the present invention is shown in Table 1 in comparison with the conventional apparatus.

Figure 7:
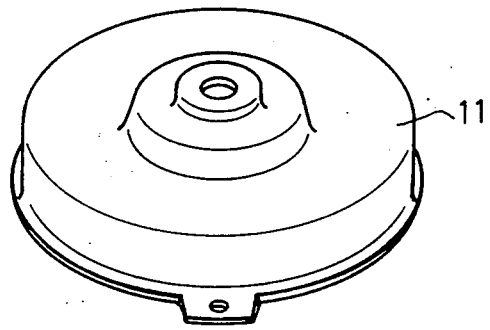
FIG. 7 is the perspective view of the frame bracket of the conventional coreless electric motor of FIG. 6.

FIG. 7 shows the outer frame bracket of the conventional coreless electric motor which has no ribs.

Figure 2:
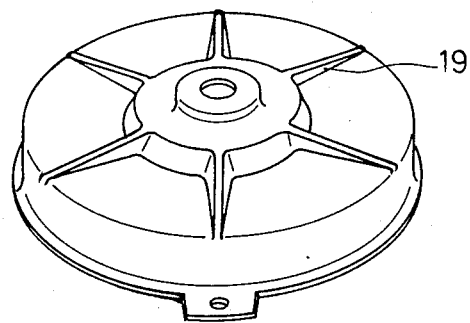
FIG. 2 is a perspective view of a frame bracket of another preferred embodiment of an axial gap type coreless electric motor in accordance with the present invention.

FIG. 2 shows the outer frame bracket 16 of the embodiment in accordance with the present invention having the radial ribs 19 with an angular path of 60 degrees, and in this case the position of the ribs 19 is corresponding to the non-magnetized parts 9a to 9f of the field magnet 1 in FIG. 5.

Figure 3:
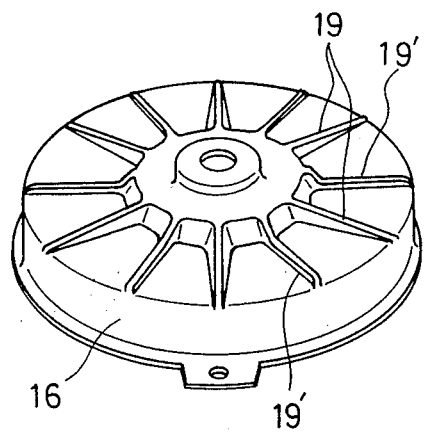
FIG. 3 is a perspective view of still another preferred embodiment of an axial gap type coreless motor in accordance with the present invention.
Figure 4:
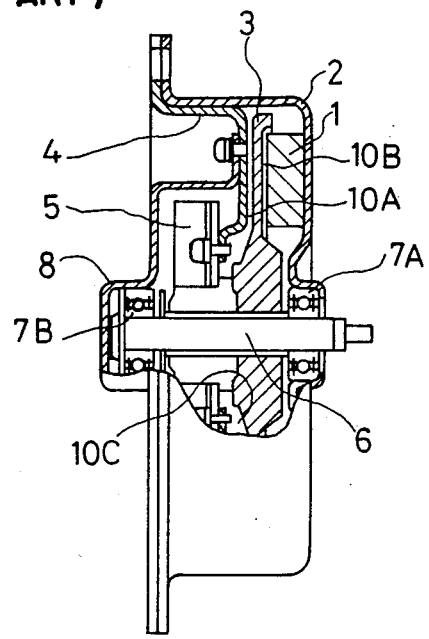
FIG. 4 is the cross-sectional side view of the conventional coreless electric motor.

FIG. 3 shows the outer frame bracket 16 of another embodiment in accordance with the present invention having the radial ribs 19 and sub-ribs 19' alternately with an angular pitch of 30 degrees, and in this case the sub-ribs 19' are disposed on respective centers of the magnetic poles. Table 1 shows the displacements of the working points when impressing a concentrated load in a direction parallel to the axis of the motor on a virtual circle having an intermediate diameter, which is equal to an intermediate diameter between the outer diameter and the inner diameter of the field magnet 12, on the opposite side on which the field magnet 12 is fixed.

TABLE 1

| Shape of the outer frame bracket | Conventional examples of FIG. 7 (no-rib) | Embodiment of FIG. 2 (wiih 6 ribs) | Embodiment of FIG. 3 (with 12 ribs) |
| --- | --- | --- | --- |
| displacement | 8.18 [μm] | 2.30 [μm] | 2.20 [μm] |

Accordingly, the rigidity of the embodiment shown in FIG. 2, which has six ribs 19, is 8.18/2.3 times larger in comparison with that of the conventional frame-bracket shown in FIG. 7. Rigidity of the embodiment in FIG. 3 which has six sub-ribs 19' besides the embodiment in FIG. 2 between the ribs 19 is still larger.

Torque T which rotates the armature 14 is proportional to magnetic flux which flows from the field magnet 12 and the electric current I which flows through the armature 14. By selecting the positions of forming the radially formed ribs 19 to be at the part above the non-magnetized radial parts 9a, 9b, 9c, 9d, 9e and 9f of the doughnut-shaped field magnet 12, there is no problem of decrease of the permanence of the magnetic circuit due to the existences of gaps between the surface of the field magnet 12 and the inside face of the outer frame bracket 16 at the parts of the radial ribs. Therefore, such forming of the ribs does not produce any necessity of an increase of electric power input.

Moreover, by disposing sub ribs 19', which have generally narrower widths than ordinary ribs 19, above the intermediate angular positions of each rib 19, namely above radii centers of each magnetic pole of the field magnet 12, the rigidity of the yoke at the part above the pole centers of the field magnet 12 where the magnetic flux density is the largest, can be greatly increased. Consequently total rigidity of the outer frame bracket 16, which is the cause of the acoustic noise, can be strengthened so that noise is effectively minimized.

The sub-ribs 19, cooperating with the ordinary ribs 19, strengthen the rigidity as shown in Table 1, and the noise reduction effect is remarkable.

Table 2 shows measured noise values of a conventional coreless electric motor without the ribs of FIG. 7, that of the embodiment of the present invention of FIG. 2, and that of another embodiment of the present invention of FIG. 3. The apparatuses of these examples are those having the field magnet 12 which is magnetized to form six magnetic poles.

TABLE 2

| | (Noise values are measured in A-character curve of the noise meter) | | |
| --- | --- | --- | --- |
| Shape of the outer frame bracket | Conventional examples of FIG. 7 (no-rib) | Embodiment of FIG. 2 (with 6 ribs) | Embodiment of FIG. 3 (with 12 ribs) |
| Noise value | 58 [dB] | 54 [dB] | 52 [dB] |

Instead of the above-mentioned examples of the present invention, wherein the field magnet 12 has six magnet poles, the field magnet can be that which has other numbers of magnet poles and such a one can show the same effect.

What is claimed is:

1. An axial gap type coreless electric motor comprising:
   a flat disk type coreless armature rotatably disposed with a small gap against a field magnet,
   a frame bracket which serves as a magnetic yoke and is disposed on an opposite side of said armature against said field magnet with a predetermined small gap in between,
   said frame bracket having radial ribs formed radially on the outer face of said frame bracket, and centering around a rotor shaft which is connected with said armature,
   wherein said ribs are disposed over non-magnetized parts of said field magnet.

2. An axial gap type coreless electric motor comprising:

a flat disk type coreless armature rotatably disposed with a small gap against a field magnet, a frame bracket which serves as a magnetic yoke and is disposed on an opposite side of said armature against said field magnet with a predetermined small gap in between, said frame bracket having radial ribs formed radially on the outer face of said frame bracket, and centering around a rotor shaft which is connected with said armature, wherein said ribs are disposed over non-magnetized parts of said field magnet and include sub-ribs which are also disposed radially between said radial ribs, hence, over parts of center lines of magnet poles of said field magnet.

3. An axial gap type coreless electric motor in accordance with claim 1 or claim 2, wherein:

said ribs are tapered with their widths gradually narrowed from a center part to a peripheral part of said frame bracket.

* * * * *